(12) United States Patent
Ting et al.

(10) Patent No.: US 7,723,911 B2
(45) Date of Patent: May 25, 2010

(54) FLAT FLUORESCENT LAMP AND DRIVING METHOD THEREOF, AND LIQUID CRYSTAL DISPLAY DEVICE

(75) Inventors: Chu-Chi Ting, Hualien County (TW); Yu-Heng Hsieh, Taipei (TW); Chia-Lun Lin, Taipei County (TW); Kuo-Sheng Sun, Taoyuan County (TW)

(73) Assignee: Chunghwa Picture Tubes, Ltd, Taoyuan (TW)

( * ) Notice: Subject to any disclaimer, the term of this patent is extended or adjusted under 35 U.S.C. 154(b) by 536 days.

(21) Appl. No.: 11/308,510

(22) Filed: Mar. 31, 2006

(65) Prior Publication Data

US 2007/0228925 A1 Oct. 4, 2007

(51) Int. Cl.
*H01J 1/62* (2006.01)
(52) U.S. Cl. .................. 313/491; 313/493; 315/115
(58) Field of Classification Search ........... 313/491, 313/493, 607; 315/115
See application file for complete search history.

(56) References Cited

U.S. PATENT DOCUMENTS

| | | | |
|---|---|---|---|
| 6,611,092 B2 * | 8/2003 | Fujishiro | 313/493 |
| 2002/0163216 A1 | 11/2002 | Delavalle et al. | |
| 2004/0150317 A1 * | 8/2004 | Kim et al. | 313/491 |
| 2004/0150318 A1 | 8/2004 | Kim et al. | |
| 2005/0184666 A1 * | 8/2005 | Park et al. | 313/607 |
| 2008/0018258 A1 * | 1/2008 | Aizawa | 315/115 |

FOREIGN PATENT DOCUMENTS

| | | |
|---|---|---|
| CN | 1697118 | 11/2005 |
| WO | 2005072022 | 8/2005 |

OTHER PUBLICATIONS

"The high efficiency and long life span plasma flat fluorescence lamp equipped with innovative dual driving waveforms" jointly authored by Ting, et al., IDW/ AD'05, Jun. 12-Sep. 12, pp. 1265-1268, Takamatsu, Japan.
"1st Office Action of Counterpart China Application", issued on May 22, 2009, p. 1-p. 8.
"2nd Office Action of China counterpart application", issued on Oct. 16, 2009, p. 1-p. 8.

* cited by examiner

*Primary Examiner*—Nimeshkumar D Patel
*Assistant Examiner*—Mary Ellen Bowman
(74) *Attorney, Agent, or Firm*—Jianq Chyun IP Office

(57) ABSTRACT

A flat fluorescent lamp is provided. In the flat fluorescent lamp, a discharge gas and a fluorescent material are disposed inside a chamber; first and second electrodes covered by a dielectric layer are disposed at the bottom of the chamber; first protruding points are disposed on a first side of each electrode; and second protruding points are disposed on a second side of each electrode. In each electrode, the first and the second protruding points are alternately laid. The first light-emitting region formed between the first protruding points and the first and second electrodes corresponding thereto and the second light-emitting region formed between the second protruding points and the first and second electrodes corresponding thereto are one of the entirely not overlapping and partially overlapping. Further, a driving method for the flat fluorescent lamp and a liquid crystal display device having the flat fluorescent lamp are provided.

17 Claims, 9 Drawing Sheets

FLAT FLUORESCENT LAMP AND DRIVING METHOD THEREOF, AND LIQUID CRYSTAL DISPLAY DEVICE

BACKGROUND OF THE INVENTION

1. Field of the Invention

The present invention relates to a flat fluorescent lamp and a liquid crystal display device. More particularly, the present invention relates to a flat fluorescent lamp that can provide a planar light source with high uniformity and a liquid crystal display device having the aforementioned flat fluorescent lamp.

2. Description of the Related Art

With the rapid progress in display techniques, liquid crystal display devices have been massively deployed as the display screens of consumer electronic products including mobile phones, notebook computers, personal computers and personal digital assistants. However, the liquid crystal display panel of a liquid crystal display device has no light-emitting capability. Hence, there is a need to install a back light module underneath the liquid crystal display panel to provide all the light needed for the display function. At present, the principle types of back light module in the market include the flat fluorescent lamp (FFL), the cold cathode fluorescent lamp (CCFL) and the light-emitting diode. Among these three types of back light modules, the flat fluorescent lamp is more commonly used in the liquid crystal display device because it is cheaper to produce and occupies a smaller space.

FIG. 1 is a schematic cross-sectional view showing part of a conventional planar fluorescent lamp. As shown in FIG. 1, the conventional flat fluorescent lamp 100 comprises a top substrate 110 and a bottom substrate 120 pairing together. A discharge space is formed between the top substrate 110 and the bottom substrate 120 and the discharge space is filled with a discharge gas 130. A set of electrodes 140 is disposed on the bottom substrate 120 and a dielectric layer 150 is disposed over the set of electrodes 140 to protect the set of electrodes 140. In addition, a fluorescent material 160 is coated over the inner sidewall of the top substrate 110 and the bottom substrate 120 and the outer wall of the dielectric layer 150.

The flat fluorescent lamp 100 is driven by applying a driving voltage to the set of electrodes 140 to produce a discharge electric field E. The discharge electric field E will ionize the discharge gas 130 to produce plasma. As the excited electrons in the ions of the plasma return to a ground state, ultra-violet rays are simultaneously produced. When the ultra-violet rays from the plasma shine on the fluorescent material 160, the fluorescent material 160 will be excited to emit visible light.

At present, most flat fluorescent lamps use a driving system capable of providing a controlled local discharge, for example, a design having a plurality of protruding points on an electrode for producing a multiple of point discharges. However, such local discharge can easily lead to the production of a higher intensity beam in a local area. Hence, a regular pattern of light/dark streaks will appear. Ultimately, the degree of uniformity of the light intensity across the flat fluorescent lamp will be reduced.

SUMMARY OF THE INVENTION

Accordingly, at least one objective of the present invention is to provide a flat fluorescent lamp that can provide a light source with better uniformity.

At least a second objective of the present invention is to provide a liquid crystal display device that uses a flat fluorescent lamp that can provide a light source with better uniformity to improve the quality of images.

At least a third objective of the present invention is to provide a driving method for a flat fluorescent lamp that can provide a light source with better uniformity.

To achieve these and other advantages and in accordance with the purpose of the invention, as embodied and broadly described herein, the invention provides a flat fluorescent lamp. The flat fluorescent lamp comprises a chamber, a discharge gas, a plurality of first electrodes, a plurality of second electrodes, a dielectric layer and a fluorescent material. The discharge gas is disposed inside the chamber and the first and second electrodes are disposed at the bottom of the chamber. The first dielectric layer covers the first and the second electrodes and the fluorescent material is disposed inside the chamber. A first side of each first and second electrode has a plurality of first protruding points disposed thereon and a second side of each first and second electrode has a plurality of second protruding points disposed thereon. In the same first and second electrode, the first and the second protruding points are alternately laid. Furthermore, a first light-emitting region is formed between the first protruding points and the corresponding first electrodes and second electrodes opposite to the first protruding points. Further, a second light-emitting region is formed between the second protruding points and the corresponding first electrodes and second electrodes opposite to the second protruding points. The first light-emitting region and the second light-emitting region are one of the entirely not overlapping and partially overlapping.

In one embodiment of the present invention, the distance between two neighboring first protruding points and the distance between two neighboring second protruding points are the same for the same first and second electrodes in the flat fluorescent lamp.

In one embodiment of the present invention, the distance between neighboring first protruding point and second protruding point is equal to a half of the distance between two neighboring first protruding points for the same first and second electrodes in the flat fluorescent lamp.

In one embodiment of the present invention, the flat fluorescent lamp further includes a first inverter and a second inverter. The first inverter has a first contact and second contact having opposite polarity. The first contact is electrically connected to the first electrodes and the second contact is electrically connected to the second electrodes. Further, the second inverter has a third contact and a fourth contact having opposite polarity. The third contact is electrically connected to the second electrodes and the fourth contact is electrically connected to the first electrodes.

In one embodiment of the present invention, the flat fluorescent lamp further includes a first inverter having a first contact and a second contact having opposite polarity. The first contact is electrically connected to the first electrodes and the second contact is electrically connected to the second electrodes.

In one embodiment of the present invention, the chamber includes a first substrate, a second substrate and an edge frame. The second substrate and the first substrate face each other with the first and second electrodes disposed on the first substrate. The edge frame is disposed between the first substrate and the second substrate.

In one embodiment of the present invention, the chamber further includes a plurality of spacers disposed between some of the first and second electrodes and the second substrate.

In one embodiment of the present invention, the flat fluorescent lamp comprises further includes a diffusion plate disposed on the second substrate.

The present invention also provides a liquid crystal display device comprising a liquid crystal display panel and the foregoing flat fluorescent lamp. The flat fluorescent lamp is disposed on one side of the liquid crystal display panel to provide a back light source to the liquid crystal display panel.

The present invention also provides a driving method for driving the flat fluorescent lamp mentioned above. With such method, the first light-emitting region and the second light-emitting region of the flat fluorescent lamp emit light interleavedly, and the light emitting frequency of the first light-emitting region and the second light-emitting region is between 10 kHz and 500 kHz.

In one embodiment of the present invention, the light emitting frequency of the first light-emitting region and the second light-emitting region is between 40 kHz and 80 kHz.

In one embodiment of the present invention, the difference between the light emitting time of the first light-emitting region and the light emitting time of the second light-emitting region is between 0.001 second and 0.02 second.

In the flat fluorescent lamp of the present invention, at least some of the first light-emitting region and the second light-emitting region do not overlap. Hence, lighting up the first light-emitting region and the second light-emitting region of the flat fluorescent lamp alternately is able to increase the uniformity of the light emission from the flat fluorescent lamp.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
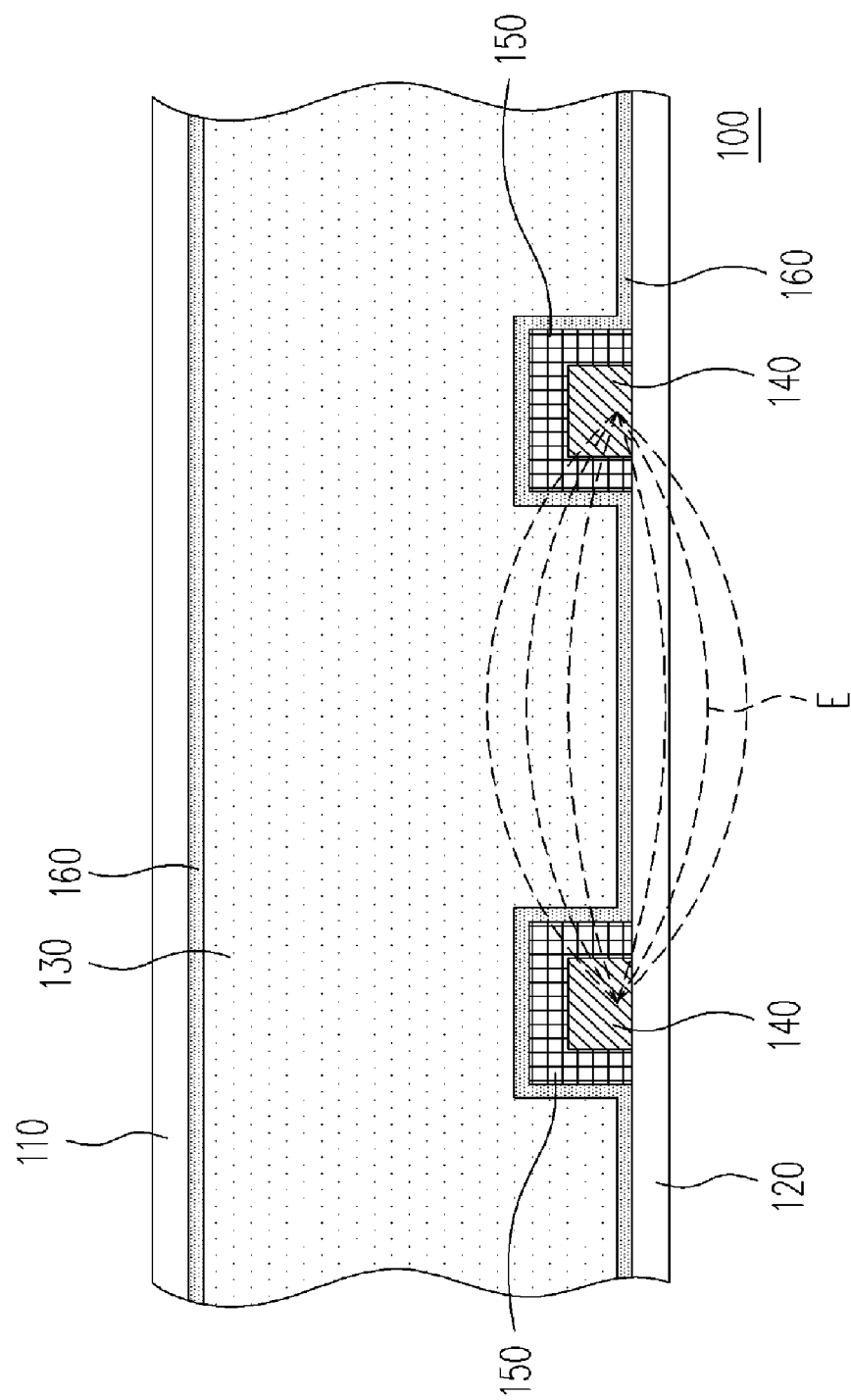
FIG. 1 is a schematic cross-sectional view showing part of a conventional planar fluorescent lamp.

Reference will now be made in detail to the present preferred embodiments of the invention, examples of which are illustrated in the accompanying drawings. Wherever possible, the same reference numbers are used in the drawings and the description to refer to the same or like parts.

Figure 2:
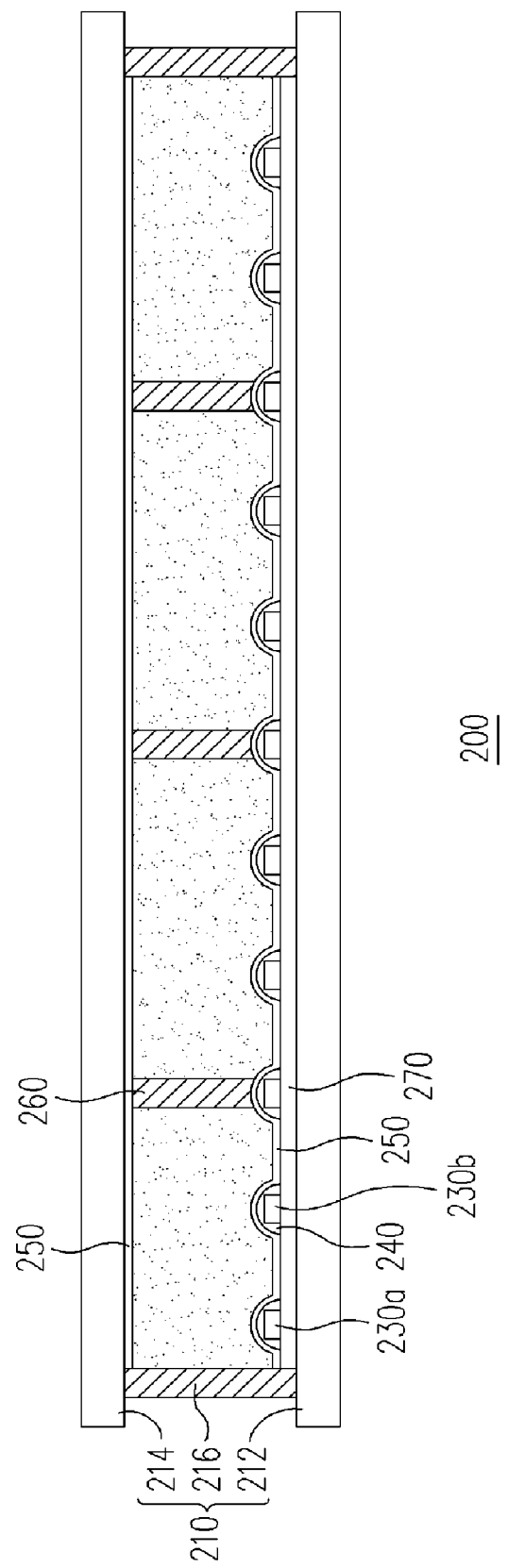
FIG. 2 is a schematic cross-sectional view of a flat fluorescent lamp according to one embodiment of the present invention.
Figure 3A:
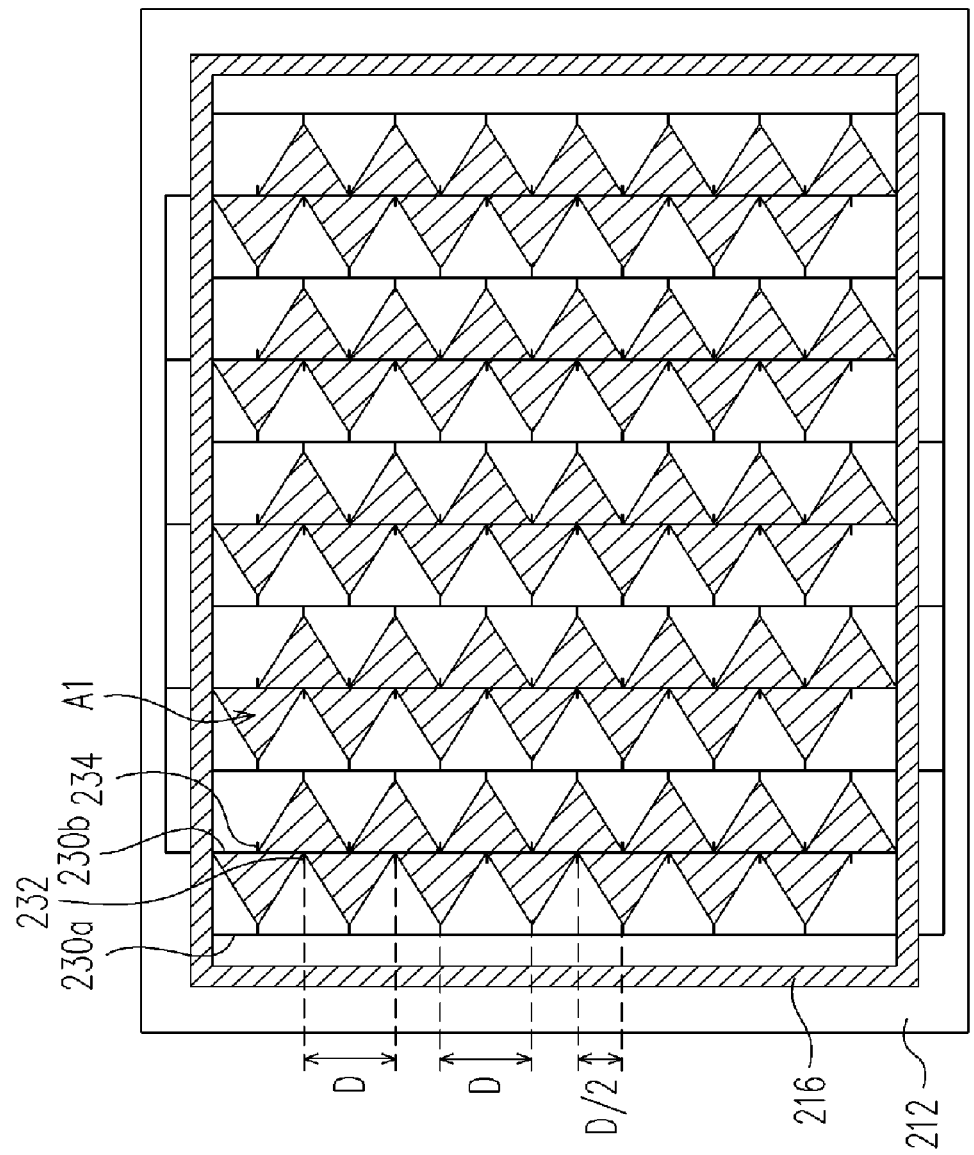
FIG. 3A is a top view showing the first light-emitting region of the flat fluorescent lamp in FIG. 2.
Figure 3B:
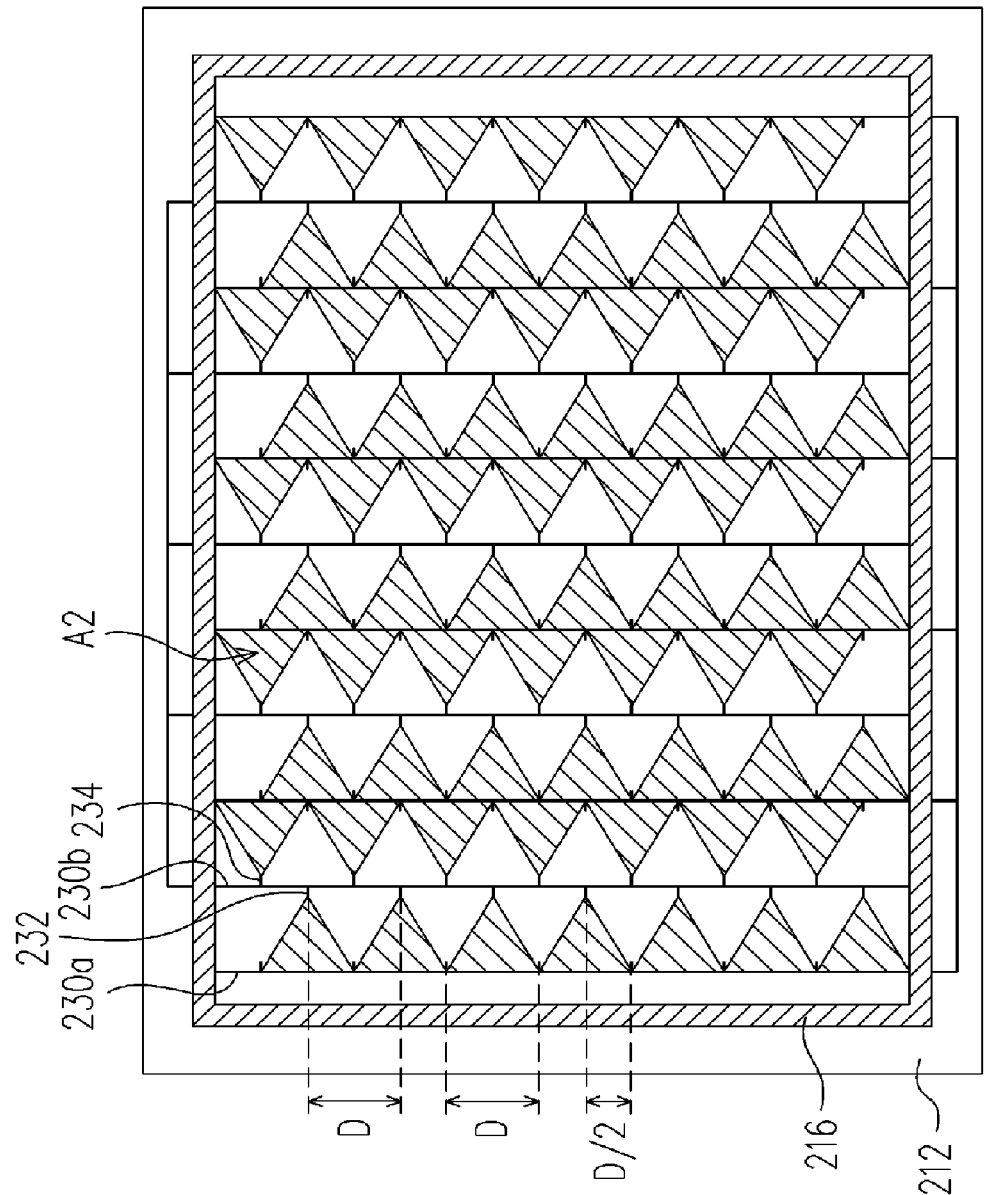
FIG. 3B is a top view showing the second light-emitting region of the flat fluorescent lamp in FIG. 2.

FIG. 2 is a schematic cross-sectional view of a flat fluorescent lamp according to one embodiment of the present invention. FIG. 3A is a top view showing the first light-emitting region of the flat fluorescent lamp in FIG. 2. FIG. 3B is a top view showing the second light-emitting region of the flat fluorescent lamp in FIG. 2. As shown in FIGS. 2, 3A and 3B, the flat fluorescent lamp 200 in the present embodiment comprises a chamber 210, a discharge gas 220, a plurality of first electrodes 230a, a plurality of second electrodes 230b, a dielectric layer 240 and a fluorescent material 250. The discharge gas 220 is disposed inside the chamber 210 and the first and second electrodes 230a, 230b are disposed at the bottom of the chamber 210. The dielectric layer 240 covers the first and the second electrodes 230a, 230b and the fluorescent material 250 is disposed inside the chamber 210. A first side of each first and second electrode 230a, 230b has a plurality of first protruding points 232 disposed thereon and a second side of each first and second electrode 230a, 230b has a plurality of second protruding points 234 disposed thereon. In the same first electrode 230a and second electrode 230b, the first protruding points 232 and the second protruding points 234 are alternately disposed. Furthermore, a first light-emitting region A1 is formed between the first protruding points 232 and the corresponding first electrodes 230a and second electrodes 230b opposite to the first protruding points 232. Further, a second light-emitting region A2 is formed between the second protruding points 234 and the corresponding first electrodes 230a and second electrodes 230b opposite to the second protruding points 234. The first light-emitting region A1 and the second light-emitting region A2 are one of the entirely not overlapping and partially overlapping.

In the aforementioned flat fluorescent lamp 200, the discharge gas 220 is an inert gas such as xenon (Xe), neon (Ne) or argon (Ar), for example. The dielectric layer 260 is fabricated using a ceramic material, for example. In addition, the chamber 210 comprises a first substrate 212, a second substrate 214 and an edge frame 216. The second substrate 214 and the first substrate 212 face each other. The first electrodes 230a and the second electrodes 230b are disposed on the first substrate 212 and the edge frame 216 is disposed between the first substrate 212 and the second substrate 214. Furthermore, the chamber 210 may also include a plurality of spacers 260 disposed between the first substrate 212 and the second substrate 214. The spacers form a plurality of discharge spaces between the first substrate 212 and the second substrate 214 and inside the edge frame 216.

The bottom of the chamber 210 (the first substrate 212) has a reflective layer 270 disposed thereon, for example. Furthermore, the fluorescent material 250 on the first substrate 212 also covers the reflective layer 270. The reflective layer 270 is fabricated using white ceramics such as titanium oxide ($TiO_2$) or silicon oxide ($SiO_2$), for example. The reflective layer 270 is a medium for reflecting the light emitted from the fluorescent material 250 so that the light will emerge from the second substrate 214.

In the present embodiment, the shape of the first and the second electrode 230a, 230b is a strip shape, for example, but should not be limited as such. To prevent any overlapping between the first light-emitting region A1 and the second light-emitting region A2, the neighboring first electrode 230a and the second electrode 230b must be set a suitable distance apart. In addition, the distance between two neighboring first protruding points 232 and the distance between two neighboring second protruding points 234 in the same first electrode 230a and second electrode 230b are the same (for example, equal to D) and the distance between neighboring first protruding point 232 and the second protruding point 234 are equal to a half of the distance between two neighboring first protruding points 232 in the same first electrode 230a and second electrode 230b (for example, equal to D/2). Thus, the first light-emitting region A1 and the second light-emitting region A2 have no overlap and the uniformity of the emitting light from the flat fluorescent lamp 200 can be improved.

Figure 4A:
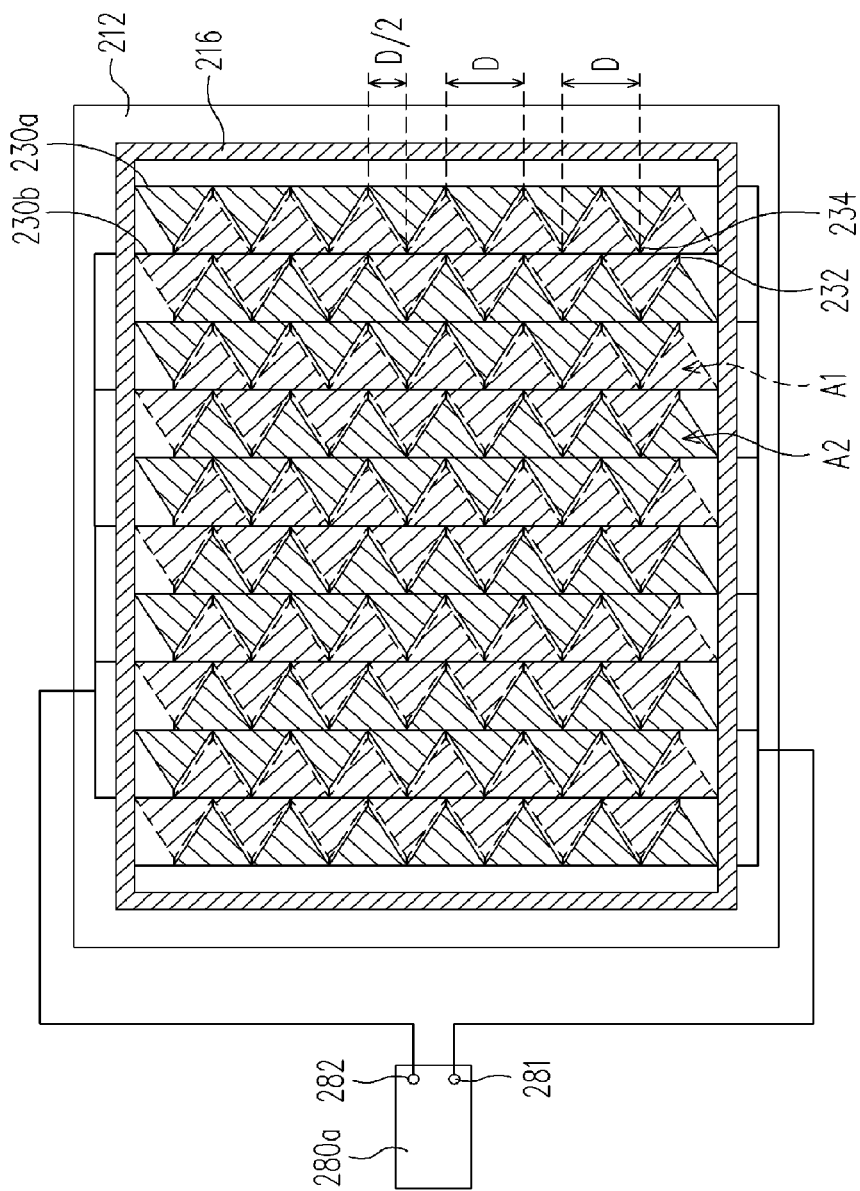
FIG. 4A is a top view showing a flat fluorescent lamp with an inverter.
Figure 4B:
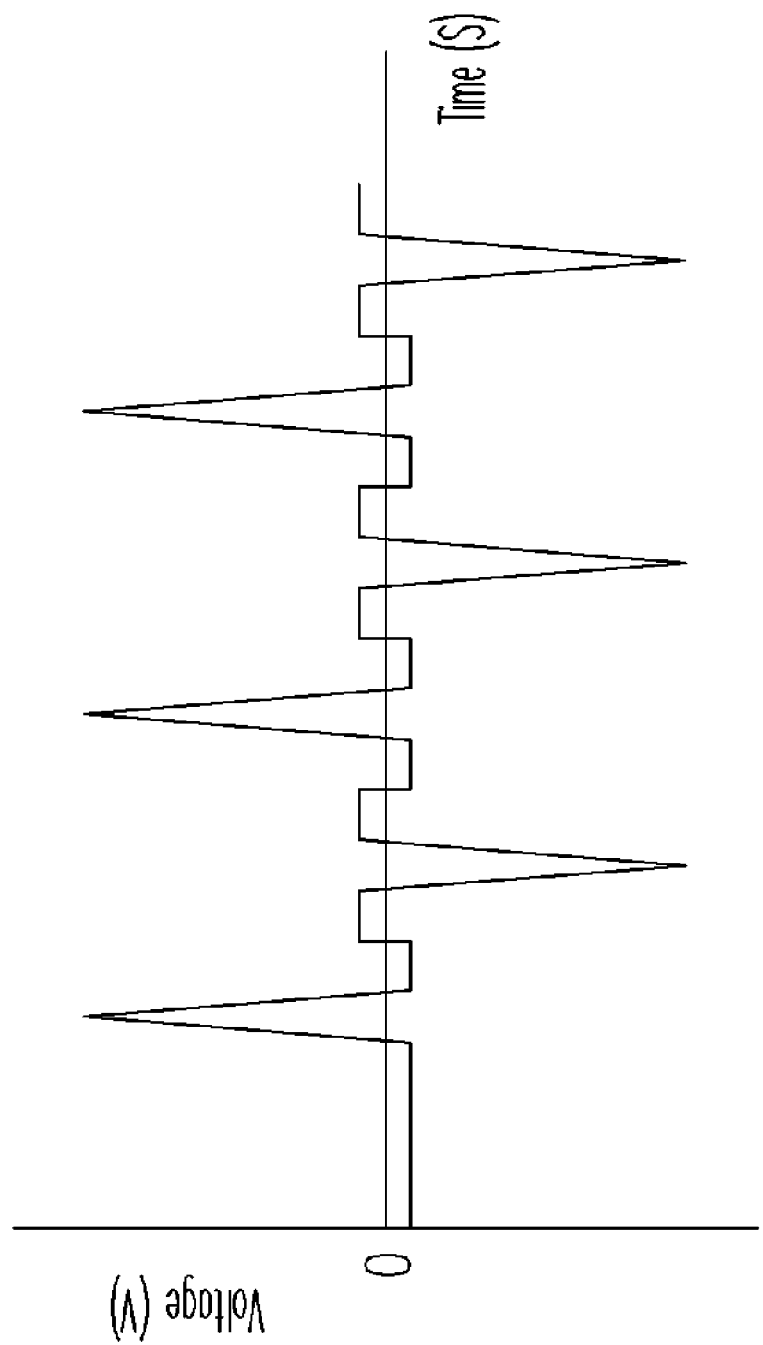
FIG. 4B is a diagram showing the waveform for driving the flat fluorescent lamp in FIG. 4A.

Below, the driving method for the flat fluorescent lamp of the present embodiment is described. Referring to FIGS. 4A and 4B wherein FIG. 4A is a top view showing a flat fluorescent lamp with an inverter, and FIG. 4B is a diagram showing the waveform for driving the flat fluorescent lamp in FIG. 4A. The first electrodes 230a and the second electrodes 230b can be driven by a first inverter 280a electrically connected to the first electrodes 230a and the second electrodes 230b so that the first light-emitting region A1 and the second light-emitting region A2 emit light alternately. More specifically, the first inverter 280a has a first contact 281 and a second contact 282 having opposite polarity. The first contact 281 is electrically connected to the first electrodes 230a and the second contact 282 is electrically connected to the second electrodes 230b. The waveform applied to the first inverter 280a is shown in FIG. 4B. When the impulse voltage is positive, the first light-emitting region A1 between the first protruding points 232 and the corresponding first electrodes 230a and second electrodes 230b opposite to the first protruding points 232 emits light. On the contrary, when the impulse voltage is negative, the second light-emitting region A2 between the second protruding points 234 and the corresponding first electrodes 230a and second electrodes 230b opposite to the second protruding points 234 emits light. Because the positive and the negative impulse are alternately produced, the first light-emitting region A1 and the second light-emitting region A2 will emit light alternately. Furthermore, the frequency of the positive impulse and the negative impulse is, for example, between 10 kHz and 500 kHz, the better is between 40 kHz and 80 kHz. The time difference T between the positive impulse and the negative impulse is, for example, between 0.001 second and 0.02 second. The width W of the positive impulse and the negative impulse is, for example, between 1 μs and 10 μs, and the amplitude of the positive impulse and the negative impulse is, for example, between 100 voltage and 4000 voltage.

Due to the visual retention of image and the frequency of the positive and negative impulse exceeds the identifiable frequency of the human eye, the light will appear to be simultaneously emitted from the first light-emitting area A1 and the second light-emitting area A2. Therefore, the uniformity of the emitting light from the flat fluorescent lamp 200 of the present invention is better. Moreover, with improved the uniformity of emitting light from the flat fluorescent lamp 200, a diffusion plate (not shown) can be disposed on the second substrate 214. The diffusion plate may have a higher light transmittance to increase the light utilization.

Therefore, under the same brightness level condition, the alternately driven first light-emitting region A1 and second light-emitting region A2 of the flat fluorescent lamp 200 requires a lower average driving current than a conventional flat fluorescent lamp 100. Therefore, the fluorescent material 250 is subjected to the impact of a weaker electric field and the probability of degradation of the fluorescent material 250 due to a strong electric field can be reduced. In other words, the flat fluorescent lamp 200 can have a longer life span.

Figure 5A:
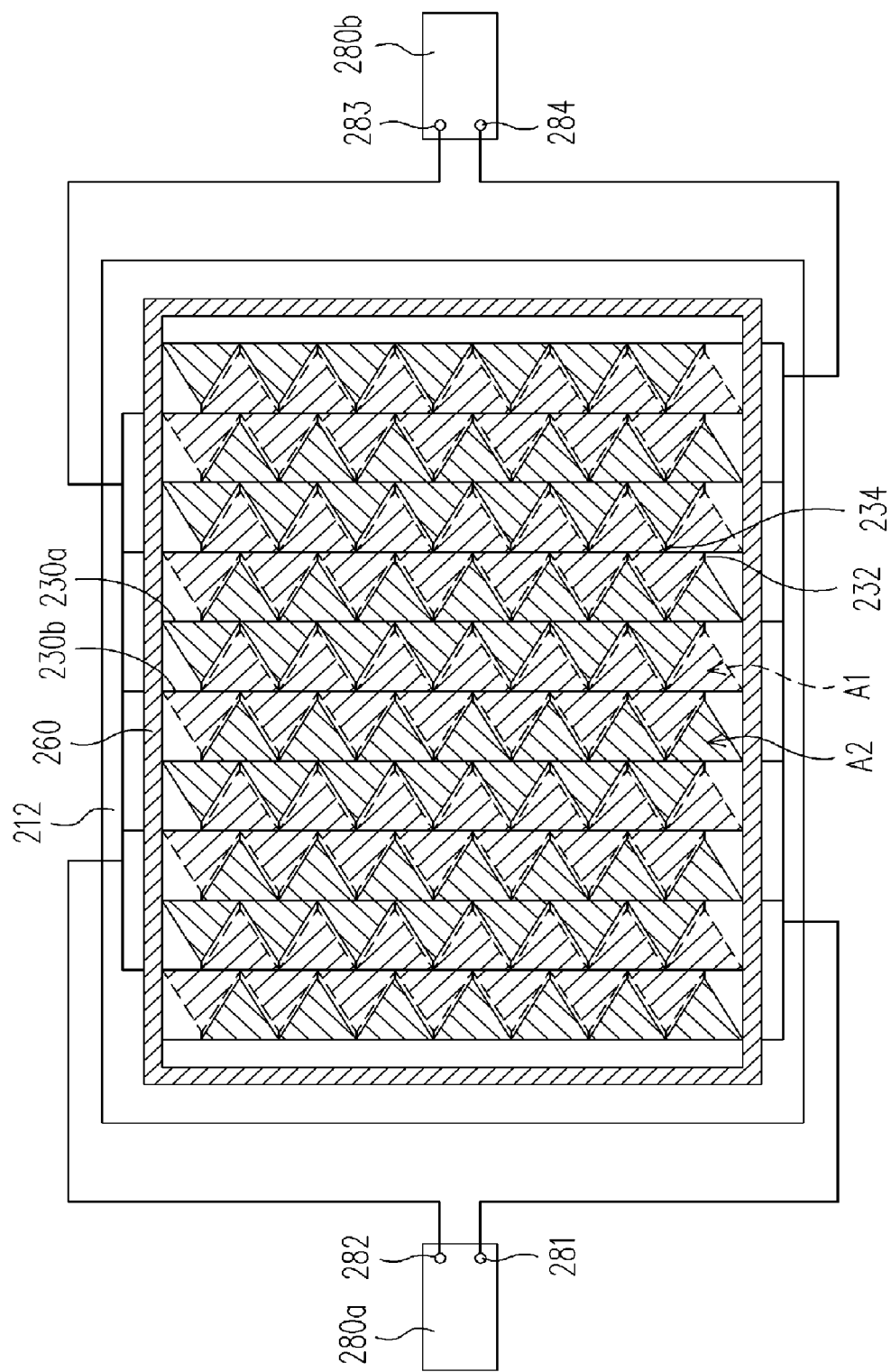
FIG. 5A is a top view showing a flat fluorescent lamp with a pair of inverters.
Figure 5B:
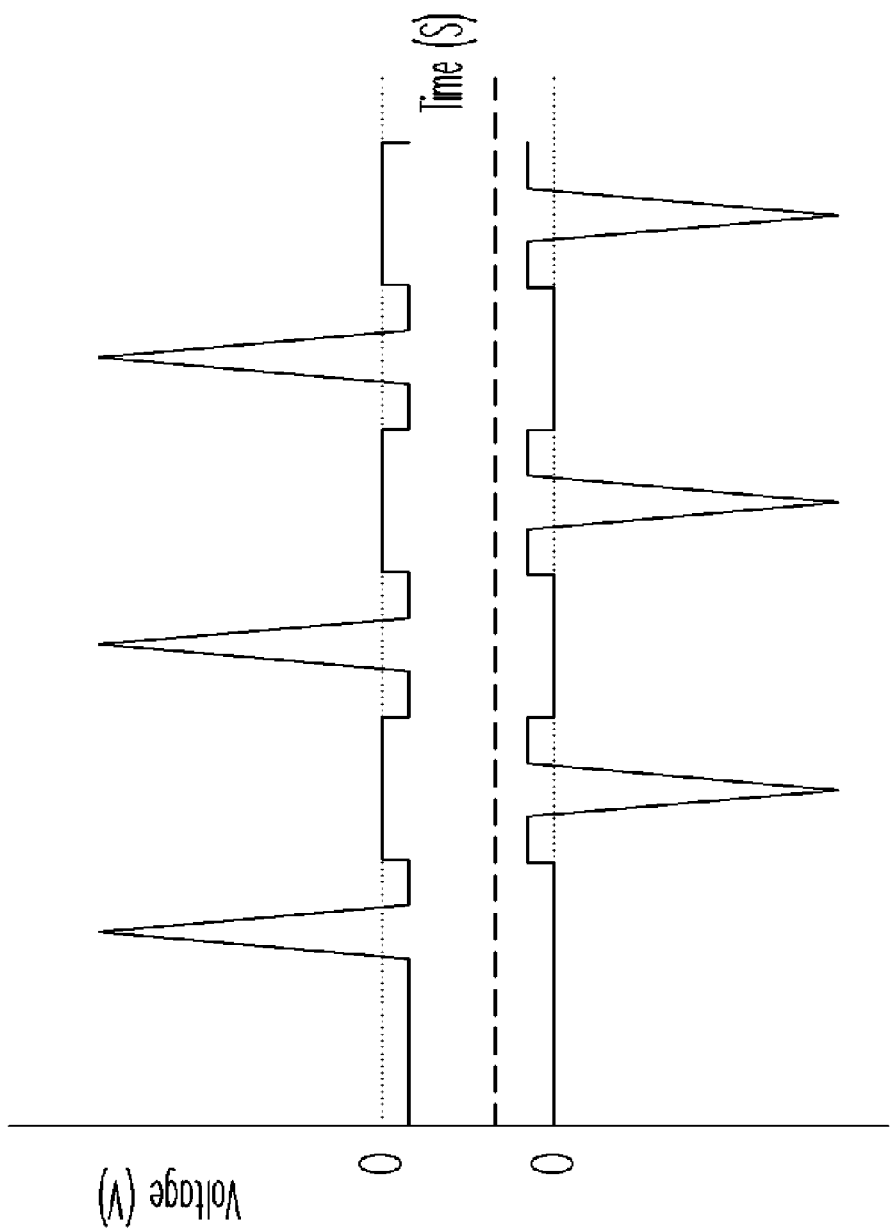
FIG. 5B is a diagram showing the waveform for driving the flat fluorescent lamp in FIG. 5A.

FIG. 5A is a top view showing a flat fluorescent lamp with a pair of inverters. FIG. 5B is a diagram showing the waveform for driving the flat fluorescent lamp in FIG. 5A. As shown in FIGS. 5A and 5B, according to the driving method for the flat fluorescent lamp of the present embodiment, the first electrodes 230a and the second electrodes 230b can be driven by a first inverter 280a and a second inverter 280b electrically connected to the first electrodes 230a and the second electrodes 230b so that the first light-emitting region A1 and the second light-emitting region A2 emit light alternately. More specifically, the first inverter 280a has a first contact 281 and a second contact 282 having opposite polarity. The first contact 281 is electrically connected to the first electrodes 230a and the second contact 282 is electrically connected to the second electrodes 230b. Further, the second inverter 280b has a third contact 283 and a fourth contact 284 having opposite polarity. The third contact 283 is electrically connected to the second electrodes 230b and the fourth contact 284 is electrically connected to the first electrodes 230a. The first contact 281 and the third contact 283 have the same polarity, and the second contact 282 and the fourth contact 284 have the same polarity.

The waveform applied to the first inverter 280a and the second inverter 280b is shown in FIG. 5B. When the impulse voltage outputted from the first inverter 280a is positive, the first light-emitting region A1 between the first protruding points 232 and the corresponding first electrodes 230a and second electrodes 230b opposite to the first protruding points 232 emits light. When the impulse voltage outputted from the second inverter 280b is negative, the second light-emitting region A2 between the second protruding points 234 and the corresponding first electrodes 230a and second electrodes 230b opposite to the second protruding points 234 emits light. Because the positive impulse outputted from the first inverter 280a and the negative impulse outputted from the second inverter 280b are alternately produced, the first light-emitting region A1 and the second light-emitting region A2 will emit light alternately. Furthermore, the frequency of the positive impulse and the negative impulse, the time difference T between the positive impulse and the negative impulse, the width W of the positive impulse and the negative impulse and the amplitude of the positive impulse and the negative impulse are similar to the foregoing mentioned and are not described again.

Figure 6:
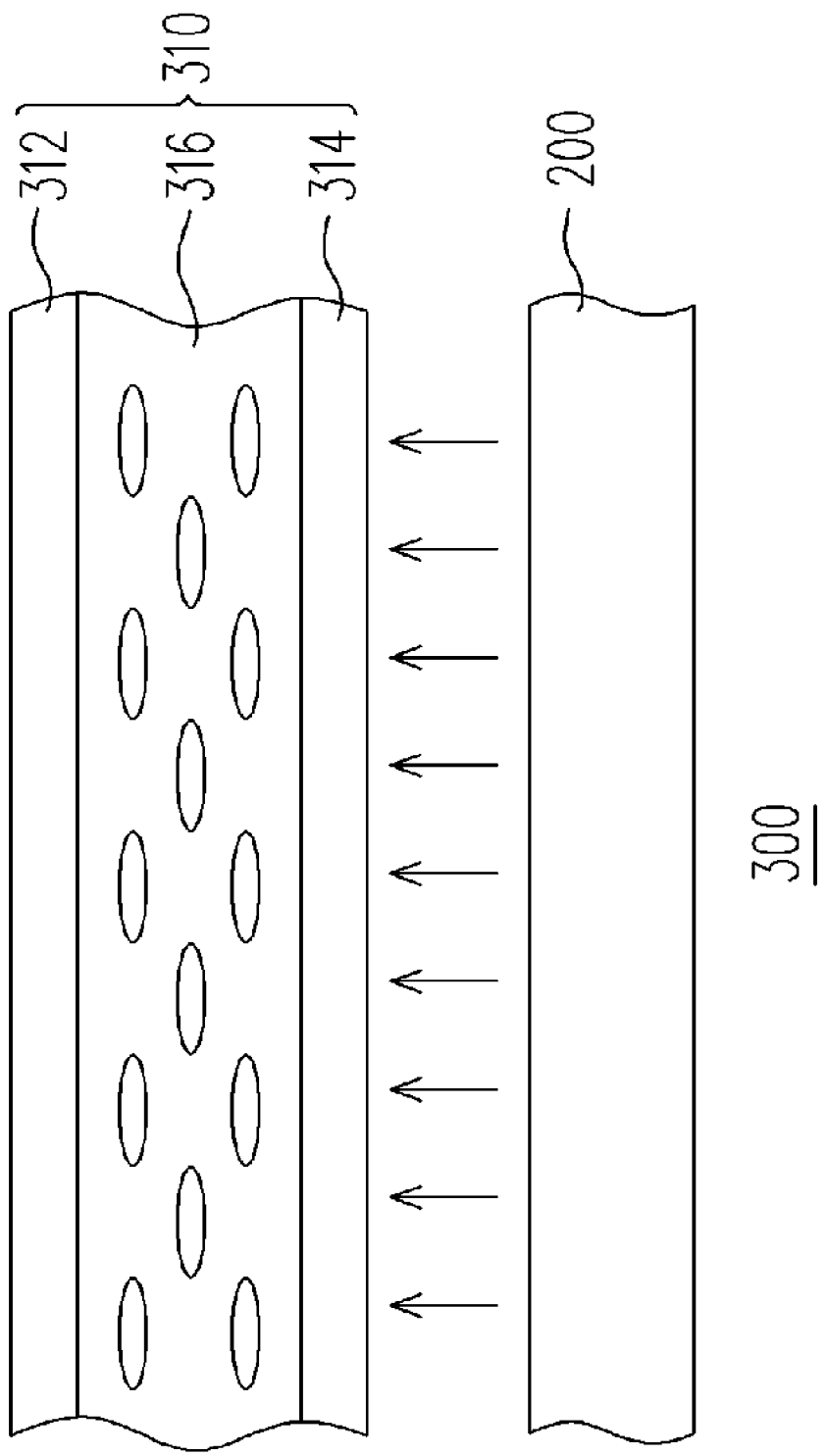
FIG. 6 is a diagram showing the structure of a liquid crystal display device according to one embodiment of the present invention.

FIG. 6 is a diagram showing the structure of a liquid crystal display device according to one embodiment of the present invention. As shown in FIG. 6, the liquid crystal display device 300 comprises a liquid crystal display panel 310 and the aforementioned flat fluorescent lamp 200 (as shown in FIG. 2). The flat fluorescent lamp 200 is disposed on one side of the liquid crystal display panel 310 to provide the back light source for the liquid crystal display panel 310. In addition, the liquid crystal display panel 310 comprises a top substrate 312, a bottom substrate 314 and a liquid crystal layer 316, for example.

The liquid crystal display device 300 in the present embodiment uses the flat fluorescent lamp 200 that can provide an emitting light with better uniformity to serve as a back light module. Hence, bright and dark regions will not appear obviously on the liquid crystal display device 300. In other words, the liquid crystal display device 300 can display images having better quality.

In summary, the advantages of the flat fluorescent lamp and liquid crystal display device of the present invention includes:

1. Because at least some of the first light-emitting region and the second light-emitting region do not overlap each other, the alternately driven first light-emitting region and the second light-emitting region can increase the uniformity of light emitting from the flat fluorescent lamp.

2. Because the flat fluorescent lamp can provide an emitting light with better uniformity, diffusion plate having a higher transmittance can be deployed to improve light utilization.

3. The flat fluorescent lamp demands a lower driving current. Therefore, the probability of degradation of the fluorescent material due to the presence of a strong electric field is reduced and the working life of the lamp is increased.

4. In the presence of the flat fluorescent lamp with uniform light emission, the quality of images displayed by the liquid crystal display device is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flat fluorescent lamp, comprising:
   a chamber, comprising;
   a first substrate;
   a second substrate facing the first substrate;
   an edge frame disposed between the first substrate and the second substrate;
   a plurality of spacers disposed between the first substrate and the second substrate;
   a discharge gas disposed inside the chamber;
   a plurality of first electrodes disposed on the first substrate;
   a plurality of second electrodes disposed on the first substrate, wherein one of the second electrodes is disposed between every two neighboring first electrodes, a plurality of first protruding points is disposed on a first side of each of the first electrodes and each of the second electrodes, the first side of each of the first electrodes and the first side of each of the second electrodes face to a same side of the flat fluorescent lamp, a plurality of second protruding points is disposed on a second side of each of the first electrodes and each of the second electrodes, and in the same first electrode and second electrode, the first protruding points and the second protruding points are alternately disposed, a first light-emitting region is formed between the first protruding points and the corresponding first electrodes and second electrodes opposite to the first protruding points, a second light-emitting region is formed between the second protruding points and the corresponding first electrodes and second electrodes opposite to the second protruding points, the first light-emitting region and the second light-emitting region are one of the entirely not overlapping and partially overlapping, and the first light-emitting region and the second light-emitting region formed by the first protruding points disposed on the first side of the same first electrode are adjacent to each other and arranged alternately;
   a dielectric layer covering the first and the second electrodes; and
   a fluorescent material disposed inside the chamber.

2. The flat fluorescent lamp of claim 1, wherein the distance between two neighboring first protruding points and the distance between two neighboring second protruding points in the same first electrode and second electrode are the same.

3. The flat fluorescent lamp of claim 2, wherein the distance between the neighboring first protruding point and second protruding point in the same first electrode and second electrode is a half of the distance between the neighboring first protruding points.

4. The flat fluorescent lamp of claim 1, further including:
   a first inverter having a first contact and a second contact having opposite polarity, wherein the first contact is electrically connected to the first electrodes while the second contact is electrically connected to the second electrodes; and
   a second inverter having a third contact and a fourth contact having opposite polarity, wherein the third contact is electrically connected to the second electrodes while the fourth contact is electrically connected to the first electrodes, and the first inverter and the second inverter are alternately driven.

5. The flat fluorescent lamp of claim 1, further including a first inverter having a first contact and a second contact having opposite polarity, and the first contact is electrically connected to the first electrodes while the second contact is electrically connected to the second electrodes.

6. The flat fluorescent lamp of claim 1, further including a diffusion plate disposed on the second substrate.

7. A liquid crystal display device, comprising:
   a liquid crystal display panel;
   a flat fluorescent lamp disposed on one side of the liquid crystal display panel for providing a back light source for the liquid crystal display panel, the flat fluorescent lamp includes:
   a chamber, comprising;
   a first substrate;
   a second substrate facing the first substrate;
   an edge frame disposed between the first substrate and the second substrate;
   a plurality of spacers disposed between the first substrate and the second substrate;
   a discharge gas disposed inside the chamber;
   a plurality of first electrodes disposed on the first substrate;
   a plurality of second electrodes disposed on the first substrate, wherein a second electrode is disposed between every two neighboring first electrodes, a plurality of first protruding points is disposed on a first side of each of the first electrodes and each of the second electrodes, the first side of each of the first electrodes and the first side of each of the second electrodes face to a same side of the flat fluorescent lamp, a plurality of second protruding points is disposed on a second side of each of the first electrodes and each of the second electrodes, and in the same first electrode and second electrode, the first protruding points and the second protruding points are alternately disposed, a first light-emitting region is formed between the first protruding points and the corresponding first electrodes and second electrodes opposite to the first protruding points, a second light-emitting region is formed between the second protruding points and the corresponding first electrodes and second electrodes opposite to the second protruding points, the first light-emitting region and the second light-emitting region are one of the entirely not overlapping and partially overlapping, and the first light-emitting region and the second light-emitting region formed by the first protruding points disposed on the first side of the same first electrode are adjacent to each other and arranged alternately;
   a dielectric layer covering the first and the second electrodes; and
   a fluorescent material disposed inside the chamber.

8. The liquid crystal display device of claim 7, wherein the distance between two neighboring first protruding points and the distance between two neighboring second protruding points in the same first electrode and second electrode are the same.

9. The liquid crystal display device of claim 8, wherein the distance between the neighboring first protruding point and second protruding point in the same first electrode and second electrode is a half of the distance between the neighboring first protruding points.

10. The liquid crystal display device of claim 7, wherein the flat fluorescent lamp further includes:
   a first inverter having a first contact and a second contact having opposite polarity, wherein the first contact is electrically connected to the first electrodes while the second contact is electrically connected to the second electrodes; and
   a second inverter having a third contact and a fourth contact having opposite polarity, wherein the third contact is electrically connected to the second electrodes while the fourth contact is electrically connected to the first electrodes.

11. The liquid crystal display device of claim 7, wherein the flat fluorescent lamp further includes a first inverter having a first contact and a second contact having opposite polarity, and the first contact is electrically connected to the first electrodes while the second contact is electrically connected to the second electrodes.

12. The liquid crystal display device of claim 7, wherein the flat fluorescent lamp further includes a diffusion plate disposed on the second substrate.

13. A driving method for a flat fluorescent lamp suitable for driving the flat fluorescent lamp of claim 1, and the method comprising:
   having the first light-emitting region and the second light-emitting region of the flat fluorescent lamp emitted light interleavedly, and the light emitting frequency of the first light-emitting region and the second light-emitting region is between 10 kHz and 500 kHz.

14. The driving method of claim 13, wherein the light emitting frequency of the first light-emitting region and the second light-emitting region is between 40 kHz and 80kHz.

15. The driving method of claim 13, wherein the difference between the light emitting time of the first light-emitting region and the light emitting time of the second light-emitting region is between 0.001 second and 0.02 second.

16. The flat fluorescent lamp of claim 1, wherein every two of the neighboring second protruding points face one of the first protruding points, and the first light-emitting region is formed between the first protruding points of each of the first electrodes and two neighboring second protruding points of one neighboring second electrode facing the first protruding points of each of the first electrodes, and between the first protruding points of each of the second electrodes and two neighboring second protruding points of one neighboring first electrode facing the first protruding points of each of the second electrodes.

17. The flat fluorescent lamp of claim 1, wherein every two of the neighboring second protruding points face one of the first protruding points, and the second light-emitting region is formed between the second protruding points of each of the first electrodes and two neighboring first protruding points of one neighboring second electrode facing the second protruding points of each of the first electrodes, and between the second protruding points of each of the second electrodes and two neighboring first protruding points of one neighboring first electrode facing the second protruding points of each of the second electrodes.

* * * * *